Jan. 13, 1970    D. Z. BLAU ET AL    3,489,495
RANGE FINDING INSTRUMENTS
Filed March 21, 1967    6 Sheets-Sheet 1

United States Patent Office 3,489,495
Patented Jan. 13, 1970

1

3,489,495
RANGE FINDING INSTRUMENTS
Donald Z. Blau, City Island, and Jesse C. Kaufman, Yorktown Heights, N.Y., assignors to Singer-General Precision, Inc., a corporation of Delaware
Filed Mar. 21, 1967, Ser. No. 624,849
Int. Cl. G01c 3/08; G01p 3/36
U.S. Cl. 356—4          35 Claims

ABSTRACT OF THE DISCLOSURE

Range finding instruments are provided for determining the range between first and second objects having a relative velocity. In each instance, the range finding instrument comprises a transmitter-receiver combination or transceiver which is disposed on one of said objects. The transmitter includes generating means in the nature of a laser for generating first and second beams of wave radiation and for transmitting the said beams to impinge upon the surface of the other of said objects to provide first and second reflected diffraction patterns of distinct lobes of random amplitude and spacing. The receiver comprises photodetector means for generating first and second frequency spectra having respective center frequencies which are determined by the respective rates at which said distinct lobes are swept past said photodetector means. Instrumentation means operable upon said first and second frequency spectra to determine the range between said first and second objects as a function of said spectra center frequencies are provided, and comprise means for separating said first and second spectra, means for locating the respective center frequency of each of said spectra, and means for comparing said center frequencies to determine said range.

---

The disclosure of this application is related, in general manner, to the disclosure of application Ser. No. 356,146 entitled "Velocimeter" of Robert A. Flower et al. filed Mar. 31, 1964, now Patent No. 3,432,237 and assigned to the assignee hereof.

BRIEF SUMMARY OF THE INVENTION

This invention relates to new and improved range finding instruments, more specifically, to new and improved range finding instruments which are particularly, though by no means exclusively, adapted for use as diffraction altimeters in aircraft in the nature of helicopters.

Although range finding instruments in the nature of altimeters are, of course, very well-known in the prior art, it is believed common knowledge that, in many instances, the prior art altimeters prove somewhat lacking in the provision of accurate indication of altitude and/or require frequent adjustment in view of constantly changing conditions to maintain the accuracy thereof within acceptable tolerances. Thus, for example, in instances wherein the altimeters of the prior art are of the barometric pressure operated type, frequent adjustment thereof to compensate for changes in barometric pressure are generally required whereby is introduced a significant source of possible altimeter error. Similarly, in instances wherein the prior art altimeters are of the echo type, which function through the atmospheric transmission and reception of wave radiation pulses, frequent altimeter adjustment may nonetheless be necessary to compensate for changes in the atmospheric index of refraction to again introduce a significant source of possible altimeter error.

As currently preferred, for use in determining the range between first and second objects having a relative velocity, the range finding instruments of the invention are disposed on one of said objects and, in each instance, comprise a transceiver which is arranged to transmit first and second beams of laser light to illuminate first and second finite areas on a reflecting surface of the second object. This provides first and second backscattered diffraction patterns of wave radiation which are received in the instrument receiver and operate the latter to generate first and second frequency spectra, the respective center frequencies of which are located and compared to provide for a direct reading of range in a cooperatively associated readout meter.

It is, accordingly, an object of this invention to provide highly accurate, new and improved range finding instruments.

Another object of this invention is the provision of new and improved range finding instruments, the accurate operation of which is substantially independent of atmospheric conditions, whereby the need for frequent adjustment thereof to compensate for changes in atmospheric conditions, and attendant introduction of a significant source of possible instrument error, are eliminated.

Another object of this invention is the provision of new and improved range finding instruments of relatively uncomplicated design and construction which require the use of only readily available components of proven dependability in the fabrication thereof, whereby long periods of accurate, substantially maintenance-free operation thereof are assured.

Another object of this invention is the provision of new and improved range finding instruments which include conveniently operable means for adjusting the accurate operational range capability thereof whereby the overall utility of the instruments may be materially increased.

A further object of this invention is the provision of range finding instruments as above which are particularly, though by no means exclusively, adapted for use as diffraction altimeters in aircraft in the nature of helicopters.

The above and other objects and advantages of the invention are believed made clear by the following detailed description thereof taken in conjunction with the accompanying drawings wherein:

Figures 1, 2:
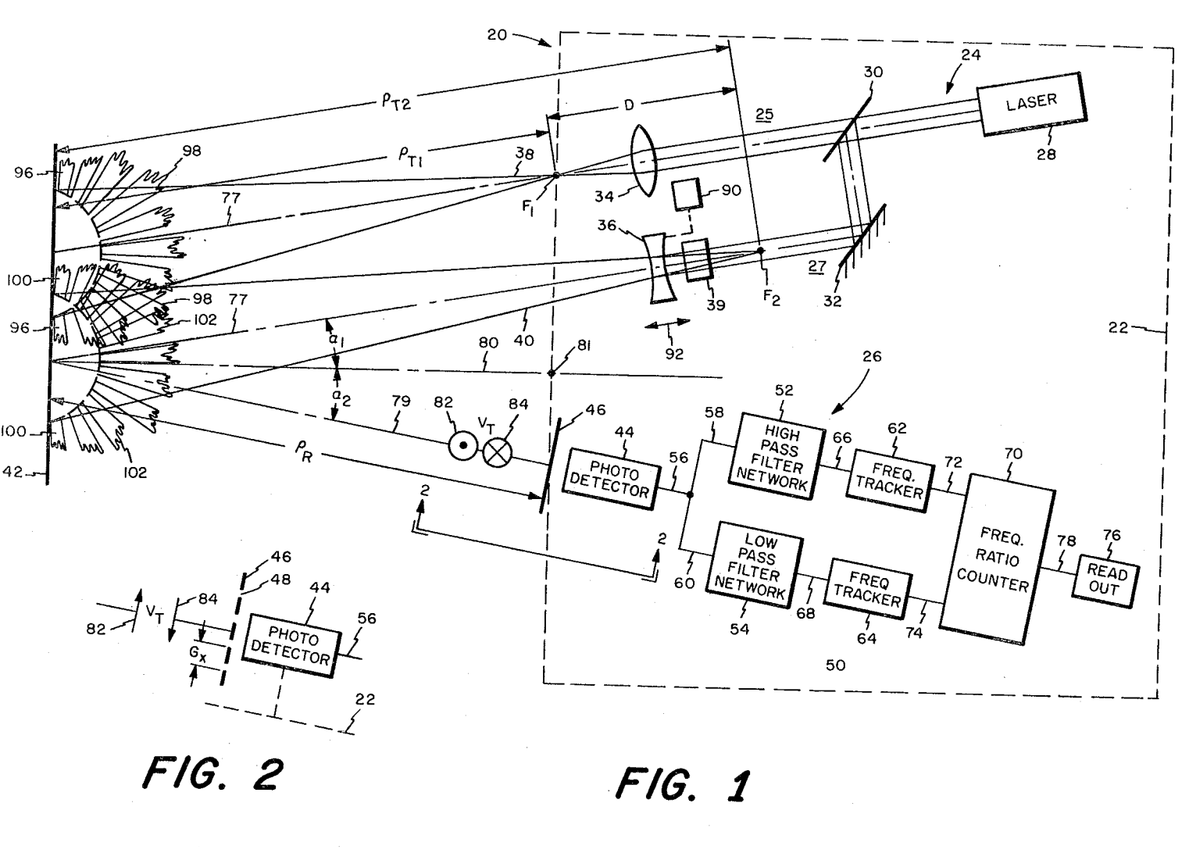
FIG. 1 is an illustration, in block diagram form, of a range finding instrument constructed in accordance with a first embodiment of this invention.
FIG. 2 is an illustration of a portion of the instrument of FIG. 1 taken in the manner indicated by the lines 2—2 in FIG. 1.

Referring now to FIG. 1, a currently preferred form of a range finding instrument constructed in accordance with the teachings of this invention in the form of a diffraction altimeter is indicated generally at 20. The instrument 20 is mounted on a mounting structure generally indicated by the dashed line boundary 22 which may, for example, consist of suitable, instrument platform means provided in an aircraft in the nature of a helicopter, and the instrument 20 is constituted by a transceiver which comprises a multibeam transmitter, as generally indicated at 24, and a receiver as generally indicated at 26.

The transmitter 24 includes laser means or other monochromatic source of electromagnetic radiation 28, beam splitter means in the nature of a partially transmitting, partially reflecting mirror 30, optical displacement means in the nature of a front surface mirror 32, and lens means 34 and 36, respectively, relatively disposed in the depicted manner on the mounting structure 22. As utilized herein, the laser means 28 function to project first and second initially spaced and substantially parallel, diverging beams of high coherent wave radiation, as indicated at 38 and 40, toward a reflecting surface or target surface as indicated at 42. In instances wherein the mounting structure 22 is constituted by helicopter borne, instrument platform means, the reflecting surface or target surface 42 might, for example, be provided by the terrain over which the helicopter is flying.

The beam splitter means 30 and lens means 34 are aligned with the optical axis of the laser means 28 to provide wave radiation beam 38, while the optical displacement means 32 and the lens means 36 are somewhat laterally displaced therefrom with the optical axes thereof also in substantial alignment to provide the wave radiation beam 40.

The effective source or focal point of the wave radiation beam 38 is indicated at $F_1$, and the effective source or focal point of wave radiation beam 40 is indicated at $F_2$. These effective sources or focal points are separated as shown by a distance D to provide a range difference equal to the separation distance D between the respective target-effective focal point ranges. Any workable combination of positive and/or negative lens means may be employed in place of lens means 34 and 36, so long as the said combination provides a separation or range difference D which is greater than 0. Thus is believed made clear that the depicted lens means configurations and arrangements are presented as illustrative, only, of one particular lens means combination which has proven satisfactory in this regard.

Referring now in detail to the receiver means 26, the same comprise photodetector means as indicated at 44 which may, for example, take the form of photomultiplier means of conventional character. Optical grating means 46 are disposed as shown between the target surface 42 and the photodetector means 44 so as to intersect the optical axis of the latter.

As seen in FIG. 2, the optical grating means 46 comprise a plurality of equally spaced, longitudinally extending transparent areas in the nature of lines or slits as indicated at 48, formed therein to alternate with equally dimensioned opaque areas; and the said lines or slits are spaced a distance $G_x$ to result in an optical grating means space frequency SF which is equal to $1/G_x$.

Dual channel instrumentation means to convert signals from the photodetector means 44 into target range or altitude readings are indicated generally at 50, and comprise a high-pass filter network 52 and a low-pass filter network 54 connected as shown to the photodetector means 44 by paths 56, 58 and 60, respectively. Frequency tracker means are indicated at 62 and 64 and are connected to the respective filter networks 52 nad 54 by paths 66 and 68. Thus are provided a first channel comprising high-pass filter network 52 and frequency tracker means 62, and a second channel comprising low-pass filter network 54 and frequency tracker means 64.

Frequency ratio counter means 70 are connected to the frequency tracker means 62 and 64 by paths 72 and 74, respectively. Readout meter means which, in this instance, might comprise a conventional altimeter type display, are indicated at 76, and connected as shown to the frequency ratio counter means 70 by path 78.

Although generally described hereinabove as a transceiver comprising transmitter means 24 and receiver means 26, it may now be understood that the range finding instrument 20 of the invention in essence comprises two transmitter receiver combinations, one of which comprises laser means 28, beam splitter means 30, lens means 34—hereinafter referred to as transmitter means 25—and the other of which comprises laser means 28, beam splitter means 30, front surface mirror 32, lens means 36, and again, the receiver means 26—hereinafter referred to as transmitter means 27.

For purposes described in detail hereinbelow, the transmitter means 24 an dthe receiver means 26 are disposed on the instrument platform means 22 so that an angle of incidence, $\alpha_1$, is formed as shown by each of the substantially parallel optical axes 77 of the transmitter means 24 and a system axis or bisector line 80 which is substantially normal to the target surface 42. In like manner, a substantially equal specular angle or angle of reflection $\alpha_2$ is formed as shown by the optical axis 79 of the receiver means 26 and the said bisector line. Although, for purposes of illustration, the respective angles $\alpha_1$ and $\alpha_2$ are depicted as of relatively substantial extent, in actual practice the said angles would be so small as to be almost negligible. Thus may be understood whereby, in actual practice, the difference between the range $\rho_R$ which is the distance measured by operation of the system of the invention and is measured as shown between the target surface 42 and the effective aperture of the photodetector means 44—which is, in this instance, provided by the optical grating means 46—and the actual range as measured along the bisector line 80 between the target surface 42 and point 81 in the direction normal to the target surface, will be so small as to also be almost negligible. For example, even with an angle of reflection $\alpha_2$, as large as 5°, and an actual range of 50 feet, $\rho_R$ will equal 50.25 feet to result in a total error of only 0.25 foot, or an error of only .005 foot per foot of actual range. Thus, for application wherein the system of the invention is utilized as a helicopter altimeter, the measured range $\rho_R$ may safely be taken as indicative of the actual craft altitude.

In the alternative, for use in range finding applications wherein even errors of this small an extent cannot be tolerated, means may be conveniently employed to substantially eliminate such errors and may, for example, involves suitable calibration of the non-illustrated display of the readout meter 76 to compensate for the said errors.

Preferably, the range finding instrument 20 is arranged as shown so that the optical grating means 46 and the effective focal point $F_1$ of diverging beam 38 are located at substantially equal ranges from the target surface 42, whereby the effective aperture of the transmitter which produces diverging beam 38 will be at a range, as indicated by $\rho_{T1}$, from the target surface 42 which will be equal to the range $\rho_R$ of the effective aperture of the receiver 26 from the said target surface. The distance between the target surface 42 and the effective focal point $F_2$ of the diverging beam 40 is indicated as $\rho_{T2}$ in FIG. 1 and determines the range for the effective aperture of the transmitter which produces diverging beam 40. The separation D, previously defined as the distance between the respective effective focal points $F_1$ and $F_2$, may thus be understood to be equal to $\rho_{T2}-\rho_{T1}$ and indicative of the difference in beam ranges.

For purposes described in detail hereinbelow relating to the provision of additional range capability for the diffraction altimeter system 20 of the invention, it may prove desirable to provide means enabling the convenient adjustment of the separation range within a relatively wide range providing, of course, that the same is maintained at a value greater than zero. For relatively small adjustments of the range separation D, servo mechanism means as indicated at 90 of any satisfactory construction may be provided, and connected to the lens means 36, as indicated by the dashed line extending therebetween, to function to adjust the position of the said lens means, relative to the lens means 34, in either direction along the beam axis 77 as indiacted by the double-headed arrow 92. Thus, for example, should it prove desirable to increase the range difference D the same might readily be effected by actuation of the servo mechanism means 90 to move lens means 36 along the axis of diverging beam 40 toward the optical displacement element 32 to thus relocate the effective focal point $F_2$ of the said beam closer to the said optical displacement element with resultant increase in the magnitude of the range difference D.

For larger adjustments of the range separation D, a plurality of lens means, one of which might be lens means 36, and each of which will provide a predetermined, effective focal point for the beam of wave radiation 40 when placed therein, may be provided for positioning at will in the said wave radiation beam. This may be accomplished in any convenient manner as, for example, in the manner illustrated by FIG. 3 wherein rotatable lens means, carrier means or turret means, including lens means 36 and 37 supported thereon, are indicated at 33 and are so positioned relative to the beam of wave radiation 40 that rotation of the said carrier means can function as indicated to replace lens means 36 with lens means 37, and vice versa. Thus, if lens means 37 will locate the effective beam focal point $F_2$ as shown to provide for a materially increased separation distance $D_1$—there being no requirement that the said focal point fall within the boundaries of the instrument support platform 22—it may be readily understood that a convenient choice is provided between the respective separation ranges D and $D_1$ through proper operation of the carrier means 33 in any convenient manner. The substitution, for lens means 36 as depicted in FIG. 1, of non-illustrated, compound lens means which are adjustable to provide for the adjustment of the effective beam focal point provided thereby would also enable the adjustment of the separation range D through the adjustment of the effective focal point $F_2$ as should be obvious.

Regardless of whether or not means are employed to enable the adjustment of the separation range D, and regardless of the form the same may take if employed, the separation range D may in any event be effectively increased through the use of optical folding means as diagrammatically indicated at 39 in FIG. 1. The said optical folding means would preferably take the form of generally conventional, spaced multiple reflecting surface means and would in essence function to compress the range separation D and thus enable the provision of relatively large range separations notwithstanding the relatively stringent space limitations with which the instrument platform means 22 may be forced to comply.

With the arrangement described, the impingement of the diverging beam of wave radiation 38 upon the target surface 42, over a finite area of the latter, will produce a backscattered diffraction pattern of wave radiation as indicated at 96. This backscattered diffraction pattern will be broad in extent if the reflecting target surface 42 is highly diffuse, as would be true in the case of terrain, and will be quite concentrated in intensity if the said surface approaches a specular condition. Also, the backscattered diffraction pattern will have its maximum intensity at the specular angle $\alpha_2$. The backscattered pattern 96 will be composed of lobes 98 of random amplitude, width and spacing. In similar manner, the impingement of diverging beam 40 of wave radiation upon the reflecting target surface 42 will produce a backscattered wave radiation diffraction pattern as indicated at 100, also composed of lobes, as indicated at 102, of random amplitude, width and spacing.

Although each of the backscattered wave radiation diffraction patterns 96 and 98 is generated by a different beam, the same may contain, in the indicated manner, lobes which do coincide, at least to a general extent, and lobes which do not coincide, with this coincidence or lack thereof being dependent primarily upon the respective characteristics of the diverging beams 38 and 40, and having, in any event, no significant effect upon the proper functioning of the diffraction altimeter system 20.

Figure 4:
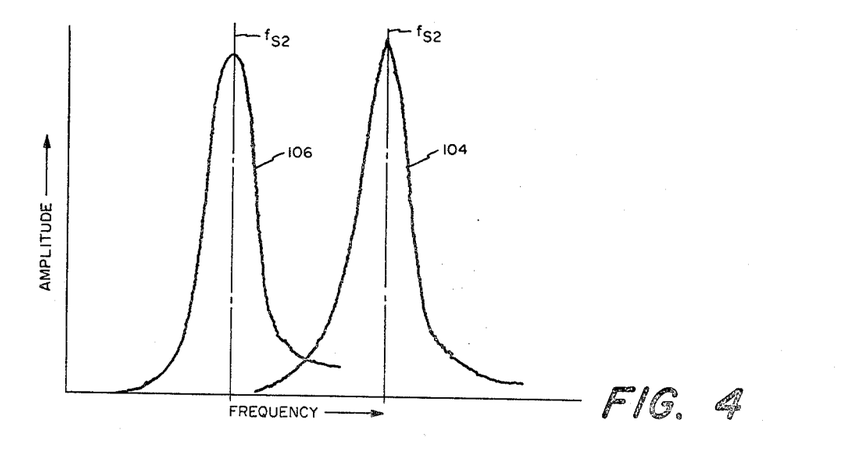
FIG. 4 is a graph illustrating representative frequency spectra as might be generated by the operation of the instruments of the invention.

With such an arrangement, relative movement or velocity between the instrument 20 and the target surface 42 giving rise to a velocity component $V_T$ (FIGS. 1 and 2) which is substantially normal to the slits or lines 48 of the optical grating means 46 will cause the respective lobes 98 and 102 of the backscattered patterns 96 and 100 to be swept across the said slits or lines and result in the generation, by the photodetector means 44, of the spectra 104 and 106 of FIG. 4. As explained in greater detail hereinbelow, it is this normal velocity component $V_T$ which enables operation of the range finding instrument of the invention whereby the said velocity component may be considered the instrument operating velocity component.

The spectrum 104 is generated as a result of the passage of the lobes 98 of the backscattered pattern 96 across the slits or lines 48 of the optical grating means 46, while the spectrum 106 is generated as a result of the passage of the lobes 102 of the backscattered pattern 100 across the said slits or lines.

Briefly described, this generation of the spectra 104 and 106 by the photodetector means 44 may be best understood if one considers, for example, a single lobe impinging on the optical grating means 46 as the latter and the lobe move relative to each other to cause the lobe to be swept across the grating.

As the lobe passes each of the slits or lines 48 a signal pulse or magnitude variation will appear at the output of the photomultiplier means to produce, as a result of the lobe passage across a plurality of the slits, a signal which consists of a train of pulses, the repetition frequency of which is dependent only on the rate at which the lobe passes the line or slits of the said optical grating means, with the said rate in turn being dependent upon the magnitude of the velocity component $V_T$. Thus, the passage in this manner of the lobes 98 of backscattered pattern 96 across the optical grating means 46 will result in the provision of a multiplicity of similar but independent pulse trains at the output path 56 of the photodetector means 44, and it is thus multiplicity of similar but independent pulse trains which form the spectrum 104. In like manner, the passage of the lobes 102 of the backscattered pattern 100 across the optical grating means 46 will result in the provision on output path 56 of the photodetector means 44 of another multiplicity of similar but independent pulse trains, and it is this another multiplicity of pulse trains which forms the spectrum 106. A somewhat more detailed explanation of the effect of the passage of the lobes of a backscattered wave radiation pattern across optical grating means which are cooperatively associated, as herein, with a photodetector device, is provided in the copending application for U.S. patent of Robert A. Flower et al., for "Velocimeter," Ser. No. 356,146, filed Mar. 31, 1964, and assigned to the assignee hereof, and reference may be had thereto, if desired, for such more detailed description.

For use as an altimeter in an aircraft in the nature of a helicopter, as indicated from below at 91 in FIG. 3A, the instrument 20 would preferably be disposed in the former in the depicted manner so that the slits or lines 48 of the optical grating means 46 would be substantially normal to the major axis 93 of the helicopter. As a result, the normal velocity, or instrument operating, component $V_T$ will—assuming non-hovering helicopter flight with negligible drift—be at a maximum and substantially equal to, or coincident with (it being recalled that the angle $\alpha_3$ of FIG. 1 will, in actual practice, be very small) the helicopter velocity $V_h$. Thus, maximum lobe sweep rate past the said optical grating means under the helicopter flight conditions referred to directly hereinabove will be assured to in turn assure advantageous operating conditions for the system 20 as discussed hereinbelow.

Figures 3, 3A, 3B:
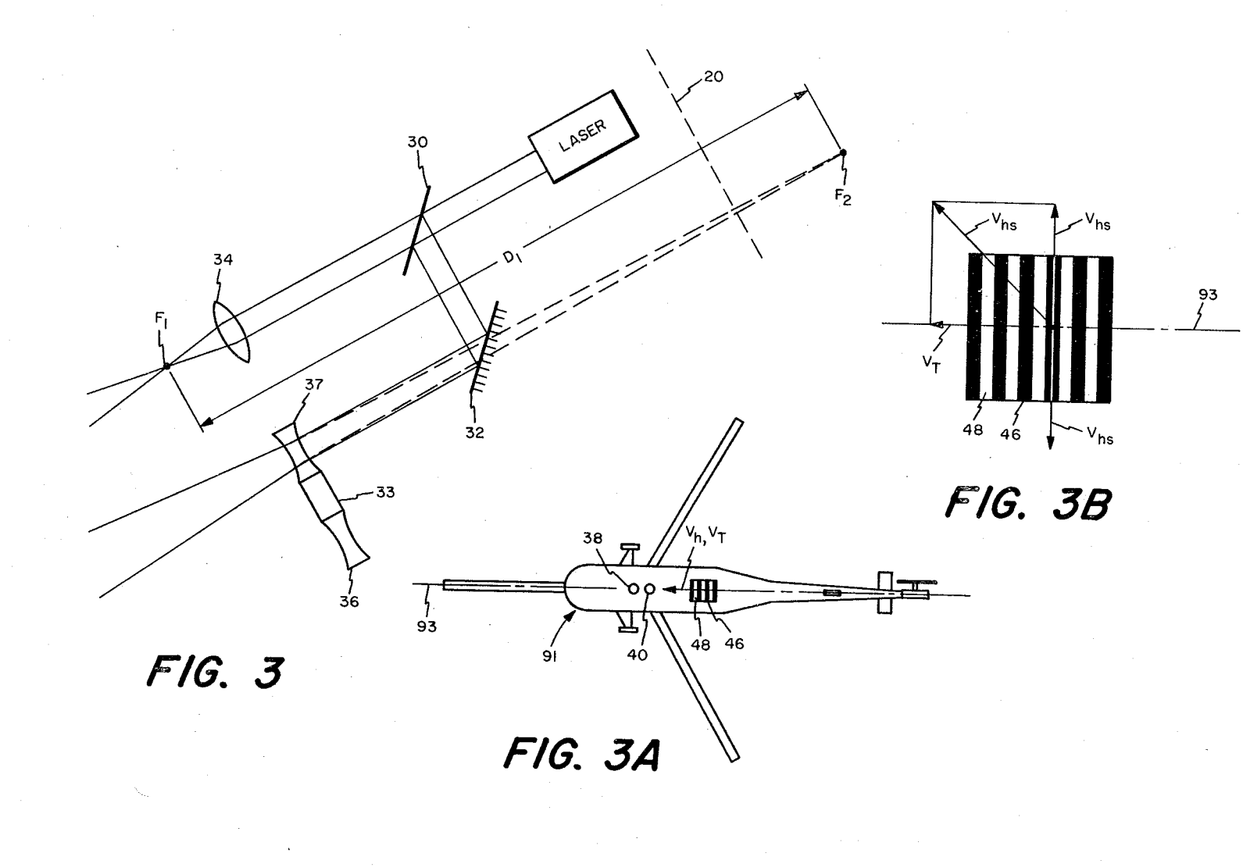
FIG. 3 is an illustration, in block diagram form, of a somewhat modified portion of the instrument of FIG. 1.
FIG. 3A depicts the bottom of a helicopter to illustrate a utilization of a range finding instrument of the invention as a helicopter altimeter.
FIG. 3B illustrates the velocity relationships between the instrument operating and helicopter velocities, respectively, of the installation of FIG. 3A.

FIG. 3B illustrates the velocity optical grating slit relationship for instances wherein the helicopter velocity $V_h$ is directed at a substantial angle to the major helicopter axis to thus indicate substantial drift—which may, of course, be purposefully induced in helicopter flight—and FIG. 3B is believed to make clear that even under relatively extreme drift conditions, the normal velocity component $V_T$ will be of not insubstantial magnitude.

It is at this juncture believed clear that the range finding instrument 20 will not operate in the substantial absence of any normal, or instrument operating, velocity component $V_T$ which provides the lobe-optical grating means sweep rate. Thus, the instrument 20 will not operate when used as a helicopter altimeter in instances wherein the helicopter velocity is directed substantially perpendicular, as indicated as $V_{hs}$, in either direction to the major axis 93; in instances wherein there is a substantial absence of helicopter velocity as in fully hovering flight; and in instances wherein the helicopter is ascending or descending substantially perpendicular to the terrain which forms the target surface. Instances of this nature which, even for helicopter flight would occur most infrequently, would not occur at all for applications wherein the system 20 were utilized as an altimeter in conventional, fixed wing aircraft in that the latter are, of course, substantially incapable of hovering or sidewards flight.

With the arrangement described, the optical leverage $L_1$ for the transmitter means 25, which is the ratio of the granule velocity of backscattered diffraction pattern 96, namely, the velocity of the lobes 98 across the optical grating means 46, to the normal velocity component $V_T$, is given by the expression:

$$L_1 = 1 + (\rho_R/\rho_{T_1}) \tag{1}$$

Similarly, the optical leverage of the transmitter means 27 which is the ratio of the granule velocity of backscattered diffraction pattern 100, namely, the velocity of lobes 102 across the optical grating means 46, to the normal velocity component $V_T$, is given by the expression:

$$L_2 = 1 + (\rho_R/\rho_{T_2}) \tag{2}$$

Since, in this instance, $\rho_{T_1}$ is equal to $\rho_R$, the optical leverage $L_1$ of transmitter means 25 will be equal to $1+1=2$; while the optical leverage $L_2$ of the transmitter means 27 will be equal to some quantity less than 2 since $\rho_{T_2}$ is greater than $\rho_R$.

With the arrangement described, the center frequency $f_{S_1}$ of the spectrum 104 is given by the expression:

$$f_{S_1} = L_1 S F V_T \tag{3}$$

and the center frequency $f_{S_2}$ of the spectrum 106 is given by the expression:

$$f_{S_2} = L_2 S F V_T \tag{4}$$

Thus, since the optical leverage $L_1$ is greater than the optical leverage $L_2$, due to the fact that $\rho_{T_1}$ is smaller than $\rho_{T_2}$, the center frequency $f_{S_1}$ of the spectrum 104 will, of necessity, be greater than the center frequency $f_{S_2}$ of the spectrum 106.

From Equations 3 and 4 it can be established that:

$$f_{S_1}/f_{S_2} = L_1/L_2 \tag{5}$$

and substituting from Equations 1 and 2 for $L_1$ and $L_2$ into Equation 5 results in:

$$\frac{f_{S_1}}{f_{S_2}} = \frac{1 + \left(\frac{\rho_R}{\rho_{T_1}}\right)}{1 + \left(\frac{\rho_R}{\rho_{T_2}}\right)} \tag{6}$$

$\rho_{T_1}$ being equal to $\rho_R$, Equation 6 may be rewritten as:

$$\frac{f_{S_1}}{f_{S_2}} = \frac{2}{1 + \left(\frac{\rho_R}{\rho_{T_2}}\right)} \tag{7}$$

If the ratio of $f_{S_1}/f_{S_2}$ is defined as R, which, in this instance, must be greater than unity since $\rho_{T_1}$ equals $\rho_R$, Equation 7 may be rewritten as:

$$R = \frac{2}{1 + \left(\frac{\rho_R}{\rho_{T_2}}\right)} \tag{8}$$

Solved for $\rho_R$, Equation 8 becomes:

$$\rho_R = \left(\frac{2}{R} - 1\right)\rho_{T_2} \tag{9}$$

Since, as made clear by FIG. 1, $\rho_{T_2}$ equals $\rho_R + D$, Equation 9 may be rewritten as:

$$\rho_R = \left(\frac{2}{R} - 1\right)(\rho_R + D) \tag{10}$$

Solving Equation 10 for $\rho_R$ establishes that:

$$\rho_R = \frac{D}{2}\left(\frac{2-R}{R-2}\right) \tag{11}$$

Thus, Equation 11 may readily be seen to relate altitude or range $\rho_R$ to the radio R of the center frequencies $f_{S_1}$ and $f_{S_2}$, and the beam geometry which defines the range separation D. This relationship between $\rho_R$ and R is believed clearly illustrated by the graph of FIG. 5 wherein curve 110 establishes the value of $\rho_R$ between approximately 0.001 and 10,000 feet when D is equal to one foot and R ranges between approximately 1.0 and approximately 1.99; curve 112 establishes the value of $\rho_R$ between approximately 0.001 and 10,000 feet when D is equal to 10 feet and R ranges between approximately 1.0 and approximately 1.99; and curve 114 establishes the value of $\rho_R$ between approximately 1.99 and 10,000 feet when D is equal to 100 feet and R ranges between approximately 1.0 and approximately 1.99. Although the curves 110, 112 and 114 are not plotted to the zero point for $\rho_R$ in FIG. 5—due primarily to the fact that the said curves would become asymptotic as the zero point for $\rho_R$ were approached—it is to be clearly understood that the diffraction altimeter of the invention will exhibit excellent zero range capabilities since zero range will be indicated, regardless of the value of D, when R is equal to 2.

Figure 5:
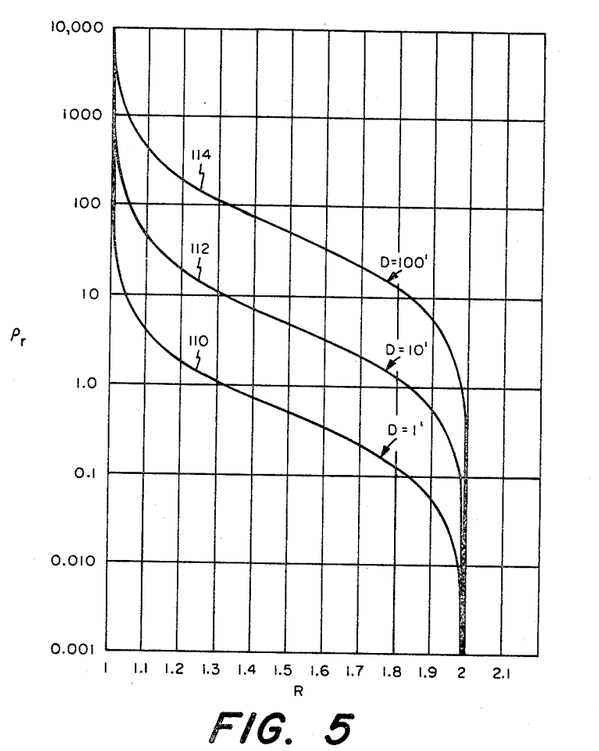
FIG. 5 is a graph illustrating the relationship between range and two operational parameters of the instrument of the invention.

The values of $\rho_R$ corresponding to a variety of values of R ranging between 1 and 2 and respective values of D of 1 foot, 10 feet, and 100 feet, all as represented by their respective curves 110, 112 and 114 of FIG. 5, are provided directly hereinbelow in Table A, it being noted that the said table includes, in addition, a column of corresponding values for $\rho_R$, normalized in terms of D.

TABLE A

| $\rho$ | $\rho_R$ for arbitrary D $\rho_R=\frac{D}{2}\left(\frac{2-R}{R-1}\right)$ | $\rho_R$ for D=1' | $\rho_R$ for D=10' | $\rho_R$ for D=100' |
| --- | --- | --- | --- | --- |
| 1 | ∞ | ∞ | ∞ | ∞ |
| 1.01 | 49.50D | 49.50 | 495.0 | 4,950 |
| 1.02 | 24.50D | 24.50 | 245.0 | 2,450 |
| 1.03 | 16.16D | 16.16 | 161.6 | 1,616 |
| 1.04 | 12.00D | 12.00 | 120.0 | 1,200 |
| 1.05 | 9.500D | 9.500 | 95.00 | 950.0 |
| 1.06 | 8.165D | 8.165 | 81.65 | 816.5 |
| 1.07 | 6.642D | 6.642 | 66.42 | 664.2 |
| 1.08 | 5.750D | 5.750 | 57.50 | 575.0 |
| 1.09 | 5.055D | 5.055 | 50.55 | 505.5 |
| 1.10 | 4.500D | 4.500 | 45.00 | 450.0 |
| 1.20 | 2.000D | 2.000 | 20.00 | 200.0 |
| 1.30 | 1.167D | 1.167 | 11.67 | 116.7 |
| 1.40 | 0.750D | 0.750 | 7.50 | 75.0 |
| 1.50 | 0.500D | 0.500 | 5.00 | 50.0 |
| 1.60 | 0.333D | 0.333 | 3.33 | 33.3 |
| 1.70 | 0.214D | 0.214 | 2.14 | 21.4 |
| 1.80 | 0.125D | 0.125 | 1.25 | 12.5 |
| 1.90 | 0.055D | 0.055 | 0.55 | 5.5 |
| 1.91 | 0.049D | 0.049 | 0.49 | 4.9 |
| 1.92 | 0.043D | 0.043 | 0.43 | 4.3 |
| 1.93 | 0.037D | 0.037 | 0.37 | 3.7 |
| 1.94 | 0.031D | 0.031 | 0.31 | 3.1 |
| 1.95 | 0.026D | 0.026 | 0.26 | 2.6 |
| 1.96 | 0.020D | 0.020 | 0.20 | 2.0 |
| 1.97 | 0.015D | 0.015 | 0.15 | 1.5 |
| 1.98 | 0.010D | 0.010 | 0.10 | 1.0 |
| 1.99 | 0.005D | 0.005 | 0.05 | 0.5 |
| 2 | 0D | 0 | 0 | 0 |

Having established that, assuming a fixed D, the range or altitude $\rho_R$ is dependent only upon the ratio R of the center frequency $f_{S_1}$ of spectrum 104 to the center frequency $f_{S_2}$ of the spectrum 106 as illustrated in FIG. 4, all that remains is the provision of a readily utilizable output signal which is indicative of the said range or altitude $\rho_R$. To this effect, the output of the photodetector means 44 which includes both of the spectra 104 and 106 is simultaneously applied, by connected paths 56, 58 and 60 (FIG. 1), respectively, to the high-pass filter network means 52 and the low-pass filter network means 54. As a result, the spectra 104 and 106 will be separated with the former being passed only by the high-pass filter network 52 and applied, by path 66, to frequency tracker means 62; and the spectrum 106 being passed only by the low-pass filter network means 54 and applied, by path 68, to the frequency tracker means 64.

The frequency tracker means 62 operate upon the spectrum 104 to locate the center frequency $f_{S_1}$ thereof and apply a signal indicative thereof, by path 72, as an input to the frequency ratio counter means 70; while the frequency tracker means 64 operate, in similar manner, upon the spectrum 106 to locate the center frequency $f_{S_2}$ thereof and apply a signal indicative thereof, by path 74, as an input to the said frequency ratio counter means.

The frequency ratio counter means 70 in essence comprise dividing circuit means which function to divide the said inputs, one by the other, to provide an output which is proportional to the ratio R of the respective center frequencies $f_{S_1}$ and $f_{S_2}$. Further included in the frequency ratio counter means 70 are multiplier means which function to provide, on path 78, an output signal indicative of units of length which are consistent with the units of length assigned in the determination of the range separation D. Since, in this instance, these units of length are feet, the output signal on path 78 is applied as indicated to readout meter means 76 which may be constituted by altimeter means comprising a display which is calibrated to read directly in feet.

The disposition of the respective transmitter and receiver means 24 and 26 on the instrument platform means 22 in the manner depicted in FIG. 1 to provide for the specular angle, or angle of incidence $\alpha_1$, and the angle of reflection $\alpha_2$, and the substantial equality between the said angles, insures that the optical grating means 46 will be so positioned as to receive the central or best defined portions of the respective backscattered diffraction patterns 96 and 100 despite the fact that the said patterns may be of maximum intensity. Thus, the sweep of lobes of substantially maximum intensity past the said optical grating means at any given normal velocity component $V_T$ will be insured, to result in maximum center frequency resolution capability and attendant system accuracy for any given reflecting surface.

Referring back to the use of servo mechanism means 90 or use of compound lens means with readily adjustable focal lengths for varying the range separation D as described in detail hereinabove, it is believed that consideration of the curves 110, 112 and 114 of FIG. 5 will, at this juncture, make the significant advantages of the increased system range capability provided thereby more apparent. Thus, for example, in the descent of a helicopter from an altitude or range of 5000 feet down to ground level or zero range, it would initially be necessary to operate the diffraction altimeter 20 of the invention with D set at 100 feet until an altitude of 495 feet or less had been reached, and then to adjust D to be equal to 10 feet for the terminal portion of the descent to make possible the provision of accurate indication of altitude throughout the entire descent. In the alternative, if very accurate incremental altitude readings were desired in the 10–25 foot range, operation of the system of the invention with D set at one foot would probably prove preferable.

A complete change or reversal of the direction of the normal component $V_T$ of system velocity will have no affect upon proper system operation because the said change in component direction will result only in the lobes 98 and 102 being swept across optical grating means 46 in the opposite direction but at the same rate. Thus, the photodetector means 44 will continue to function as described above, to generate the spectra 104 and 106 since this function is dependent only upon the rate at which the said lobes sweep across the said optical grating means, and not the direction of the lobe sweeps.

In like manner, changes in the magnitude of the velocity component $V_T$ will not affect the proper functioning of the system 20 because, as made clear by a comparison of Equations 3 and 4 above, any change in this velocity component will have the same proportional effect upon the respective values of $f_{S_1}$ and $f_{S_2}$ whereby the ratio R of the said frequencies will be totally unaffected thereby. Thus, for example, if $V_T$ were to increase from 25 feet/second to 50 feet/second, each of $f_{S_1}$ and $f_{S_2}$ would simply double (assuming no changes in $L_1$ and $L_2$) whereby the ratio R between $f_{S_1}$ and $f_{S_2}$ would remain exactly the same as would the value of the range $\rho_R$ given by Equation 11. It is, however, to be clearly understood that if the normal velocity component $V_T$ assumes a value which results in the generation by photodetector means 44 of spectra in the nature of 104 and 106 having center frequencies which fall below or exceed the tracking capabilities of the respective frequency tracker means 62 and 64, this will, of course, render the system of the invention substantially inoperative.

Figures 6, 7:
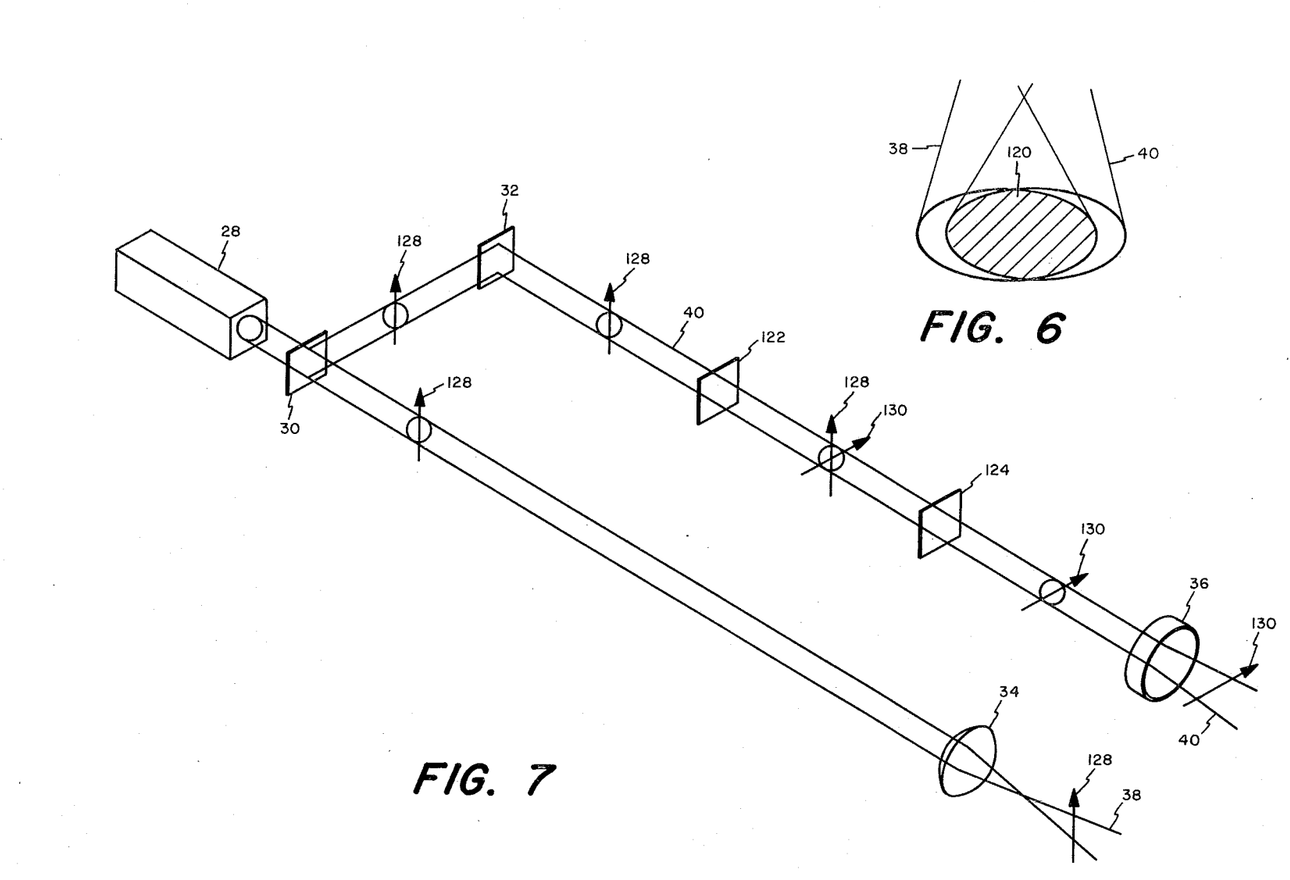
FIG. 6 illustrates, in perspective form, overlapping target surface areas as might be illuminated by the operation of the instruments of the invention.
FIG. 7 illustrates, in perspective form, a somewhat modified portion of the instrument of FIG. 1.

Overlapping of the target spots illuminated by the respective beams of wave radiation 38 and 40 to either of the partial extent indicated in FIG. 1, or the substantial extent indicated by FIG. 6 wherein the area of overlap is shaded and bears the identifying numeral 120, may, in either event, give rise to the creation of high frequency interference to result in the establishment, on the input paths 66 and 68 of the respective frequency tracker means 62 and 64, of a background noise level of sufficient magnitude to interfere with proper operation of the said frequency tracker means. In such instance, the creation of the said background noise level could, of course, be readily prevented by the greater physical separation of the beam splitter means 30, and the optical displacement and lens means 32 and 36, respectively, to result in greater separation of the respective wave radiation beams 38 and 40 with attendant complete separation of the said target spots. This apparent, and very simple, solution to the problem of a high background noise level might, however, give rise to a problem of satisfactorily packaging the respective components of the system 20 within the space available therefor. This is to say that in those instances wherein the available system package space is strictly limited, an increased physical separation of the system components referred to hereinabove of sufficient extent to reult in the desired, complete target spot separation, may prove impossible.

Thus, as an alternative which is particularly adapted for utilization in those instances wherein a high background noise level occasioned by high frequency interference of the respective beams of wave radiation 38 and 40 prevents satisfactory operation of the respective frequency tracker means throughout all frequency ranges, and wherein system package space limitations make the physical separation of the beam spots impractical or impossible, means may be provided to effect the orthogonal polarization of the respective wave radiation beams 38 and 40 and render interference therebetween, and attendant creation of a high background noise level, impossible.

As currently preferred, the said orthogonal polarization means might take the form depicted in FIG. 7 wherein the same may be seen to comprise quarter wave plate means as indicated at 122 and polarizer means as indicated at 124, respectively, disposed as shown between the optical displacement element 32 and the lens means 36, respectively. Preferably, though not necessarily, the use of such orthogonal polarization means would first comprise the determination of the direction of polarization of the linearly polarized beam from the laser means 28 and, as illustrated, the orientation of the said laser means in such manner that the wave radiation beam 38 is polarized in the vertical direction as indicated by the direction of polarization arrows 128 appearing thereon in the subject figure. Once this has been accomplished, proper orientation in the path of wave radiation beam 40 of quarter wave plate means 122 and polarizer means 124 will result in the polarization of this beam in the direction normal, as indicated by the direction of polarization arrow 130 appearing thereon, to the direction of polarization of the wave radiation beam 38. Thus, the desired orthogonal polarization relationship will be achieved and the occurrence of high frequency beam interference, and attendant high background noise level, rendered impossible.

Figure 8:
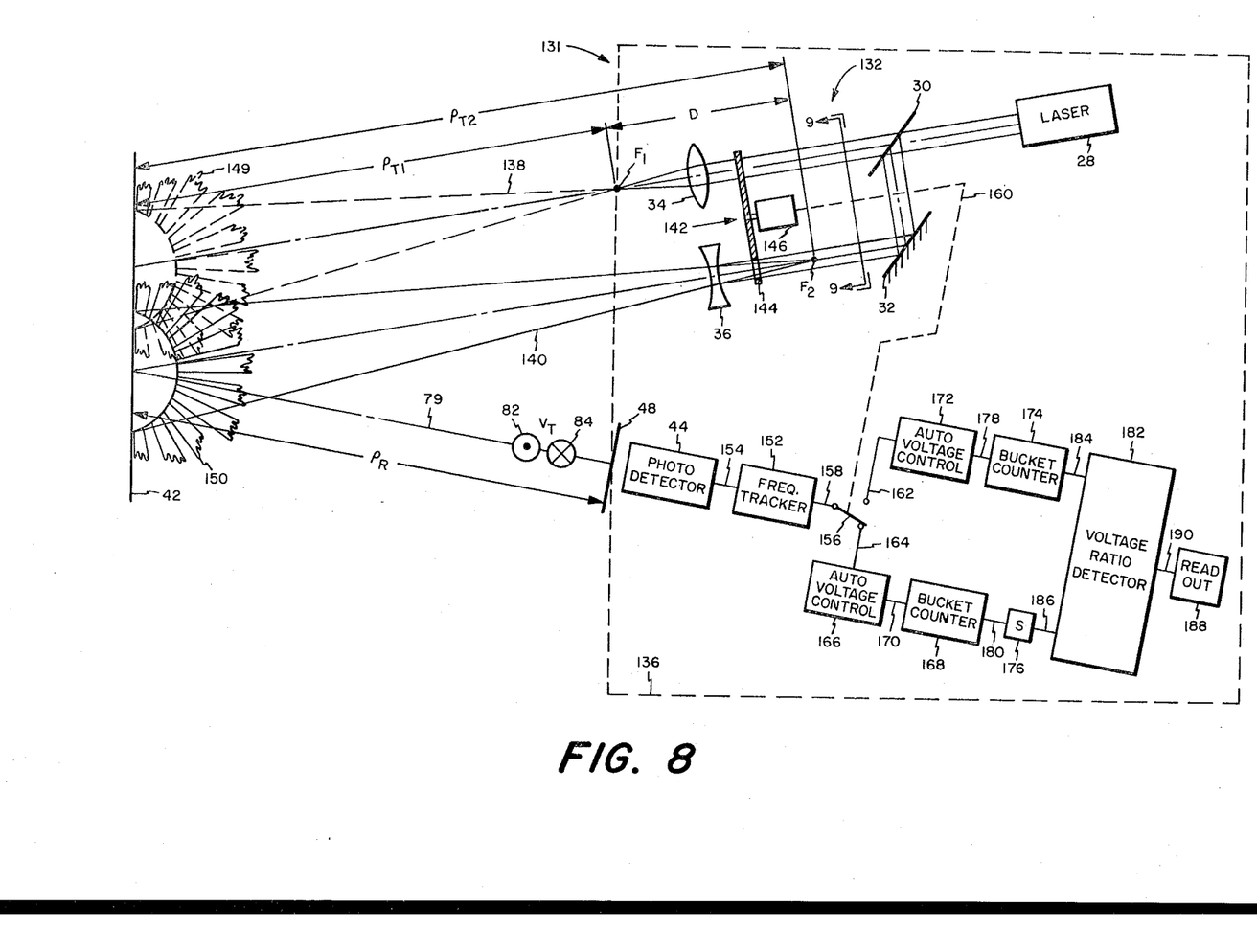
FIG. 8 illustrates, in block diagram form, a range finding instrument constructed in accordance with a second embodiment of this invention.

Referring now to the embodiment of FIG. 8, the same may be seen to comprise, in the manner of the embodiment of FIG. 1, a range finding instrument 131 including transmitter means as generally indicated at 132 and receiver means as generally indicated at 134 relatively disposed as shown on instrument platform means as indicated by the dashed line boundary 136. The transmitter means 132 of the embodiment of FIG. 8 comprise, in the manner of the transmitter means 24 of the embodiment of FIG. 1, laser means 28, beam splitter means 38, optical displacement element 32, and lens means 34 and 36, respectively, disposed as shown on the support platform 136 to provide for the projection of wave radiation beams 138 and 140, respectively, from the said transmitter means for impingement upon the target surface 42. However, since in this instance it is desired to project the said wave radiation beam alternately, rather than concurrently, for purposes made clear hereinbelow, the transmitter means 132 further comprise optical chopper means as generally indicated at 142 relatively disposed as shown on the support platform 136.

Figure 9:
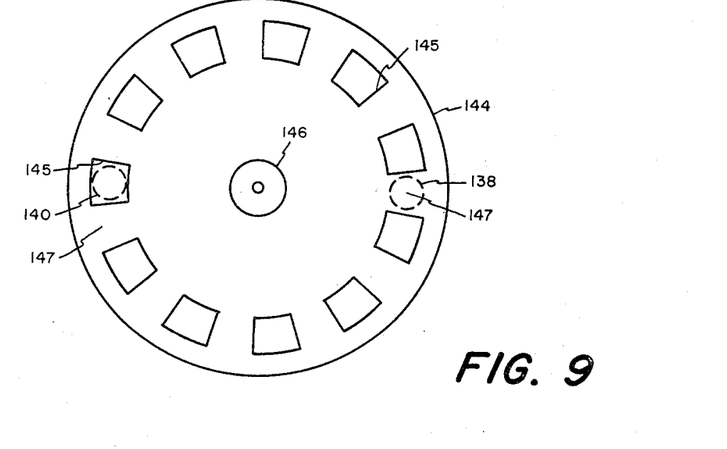
FIG. 9 is an illustration of a portion of the instrument of FIG. 8 taken in the manner indicated by the lines 9—9 in FIG. 8.

As currently preferred, the chopper means 142 comprise a disc 144 which is rotated by drive means as indicated at 146 and extends as shown into the path of each of the said wave radiation beams. The disc 144 preferably includes, in the manner depicted in FIG. 9, alternating portions 145 and 147 of transparent and opaque characteristics, respectively, and the said portions are arranged so that a transparent portion intersects one of the beams simultaneously with the intersection of the other of said beams by an opaque portion, and vice versa. Thus it is believed made clear whereby transmitter means 132 will function to intermittently transmit each of the wave radiation beams 138 and 140 toward the target surface 42 in such manner that when one of the said beams is being transmitted, the other will be blanked out, and vice versa, to provide for the intermittent illumination of the target surface spots with attendant intermittent creation of the backscattered diffraction patterns as indicated at 149 and 150. With the disc 144 disposed as indicated in FIG. 9, the wave radiation beam 140 will be projected from the transmitter means 132 while the wave radiation beam 138 will not. For this reason the latter beam, and the backscattered diffraction pattern 149 generated thereby at the target surface 42 are shown in phantom in FIG. 8.

Since at any given point in time during the operation of the system of FIG. 8, the lobes from one, only, of the said diffraction patterns will be sweeping across the optical grating means 46 and functioning to generate, in the photodetector means 44, a spectrum having a center frequency indicative of the lobe sweep rate, the output signal from the photodetector means 44 will at any given point in time, consist of one, rather than two, spectra. As a result, only one channel or frequency tracker means will be required to perform the center frequency location function and, to this effect, the receiver means 134 may be seen to comprise a single frequency tracker means 152 connected to the output of the photodetector means 44 by path 154.

Switch means, which as currently preferred are electronic switch means, are indicated at 156 and connected in the output of the frequency tracker means 152 by path 158. The said switch means are also connected, or keyed, to the disc drive means 146, as indicated by dashed line 160 extending therebetween, and are arranged so that the respective operational rates thereof are synchronized. Thus, for example, if the drive means 146 and disc means 144 are arranged to provide a beam switching frequency of 1 c.p.s., the switch means 156 will be similarly arranged to function at a switching rate of one switching function per second.

With the arrangement of FIG. 8, the switch means 156 will function to connect paths 158 and 162 for the one second duration of the transmission of wave radiation beam 138, and will then be switched to connect paths 158 and 164 as shown for the immediately following transmission of one second duration of the wave radiation beam 140, etc.

Automatic voltage control means 166, bucket counter means 168 and integrating circuit means 176 are series connected as illustrated to the switch means 156 by paths 164, 170, and 180; and automatic voltage control means 172 and bucket counter means 174 are series connected as illustrated to the switch means 156 by paths 162 and 178. Voltage ratio detector means are indicated at 182 and are connected as indicated to each of bucket counter means 174 and integrating circuit means 176 by paths 184 and 186, respectively. A readout device which, for altimeter applications, would preferably comprise an altimeter display calibrated to read directly in feet, is indicated at 188 and connected to the output of the voltage ratio detector means by path 190.

In the operation of the range finding instrument 131 of

FIG. 8 during the transmission of wave radiation beam 140 and attendant creation of the backscattered diffraction pattern 150 upon impingement of the former on the target surface 42, the lobes of the said backscattered pattern will be swept across the optical grating means 46 at a rate determined by the normal velocity component $V_T$ to result in the generation, by photodetector means 44, of a spectrum in the nature of 106 (FIG. 4) on photodetector means output path 154.

Application of this spectrum to the frequency tracker means 152 will result in the location of the center frequency $f_{S_2}$ thereof by the said frequency tracker means and the application of an output signal indicative of this center frequency on path 158 to the switch means 156. Since, at this point in time, a transparent portion 145 of the disc 144 (FIG. 9) is intersecting the wave radiation beam 140 to thus enable the transmission of the latter to the target surface 42, while an opaque portion 147 of the disc 144 is intersecting the wave radiation beam 138 to prevent the transmission thereof to the target surface 42, the switch means 156 will be in the depicted position thereof and will function to connect paths 158 and 164 to apply the frequency tracker means output to the automatic voltage control means 166. This automatic voltage control means, and the automatic voltage control means 172 in path 162 function in the same manner to control the signal amplitudes to insure the substantial equality thereof.

The thusly controlled signal is then applied, by path 170, to the bucket counter means 168 wherein the said frequency signal is converted to a voltage indicative of the center frequency $f_{S_2}$, and this voltage signal is then applied, by path 180, to the integrating circuit means 176 which, in this instance, operate to make up the time difference occasioned by the switching function of switch means 156 to holding the voltage signal from bucket counter means 168 for one second and then applying it, by path 186, to the voltage ratio detector means 182.

At the expiration of the one second duration of the transmission of wave radiation beam 140, an opaque portion 147 of the disc 144 will commence to intersect the said beam and discontinue the transmission thereof. Simultaneously therewith, a transparent portion 145 of the disc 144 will commence to be disposed in the path of wave radiation beam to enable the transmission of the latter to the target surface 42 with attendant creation of the backscattered diffraction pattern 149 and sweep of the lobes thereof across the optical grating 46, again at a rate determined by the normal velocity component $V_T$, to result in the generation of a spectrum in the nature of spectrum 104 of FIG. 5 on the out path 154 of the photodetector means 44.

Concurrently with the discontinuance of the transmission of wave radiation beam 140, and the commencement of transmission of wave radiation beam 138, the interconnection, as indicated at 160, between the disc drive means 146 and the switch means 156 will function to switch the latter to connect paths 158 and 162. As a result, the signal on path 158 which is now indicative of the spectrum center frequency $f_{S_1}$ as generated by the lobes of the backscattered pattern 149 and located by the frequency tracker means 152, will be applied to the automatic voltage control means 172 and bucket counter means 174 by paths 162 and 178, respectively. Conversion of this signal to a voltage indicative of the center frequency by the bucket counter means 174 and simultaneous application of the resultant voltage, and the voltage held in integrating circuit means 176, to the voltage radio detector means 182 will then occur, whereby an output signal indicative of the ratio R, and thus of the range or altitude of the system 131 relative to the target surface 42, will be provided on output path 190 for application to the readout meter 188 and attendant provision by the latter of suitable indicia thereof.

One advantage of the instrument 131 of the embodiment of FIG. 8, as compared to the instrument 20 of the embodiment of FIG. 1, would reside in the fact that no frequency resolution difficulties would occur in the operation of the former because the single frequency tracker means 152 thereof is only required to locate the center frequency of only one spectrum at any given point in time. Another advantage would reside in the fact that the occurrence of high frequency noise, and an attendant high background noise level, would be rendered impossible because the respective wave radiation beams 138 and 140 are never susceptible of simultaneous transmission to the target surface 42. Also worthy of mention is the fact that the utilization of only one frequency tracker means, as made possible by the embodiment of FIG. 8, would probably lower the overall cost of the instrument to a not insignificant extent in that the said frequency tracker means constitute the most expensive single electronic component required. A disadvantage of the instrument 131 as compared to the instrument 20 might reside in the fact that the former could prove somewhat less reliable than the latter under demanding operational conditions because of the requirement for the rotating disc means 144 and synchronization of the operation of the switch means 156 with the said disc means.

Figure 10:
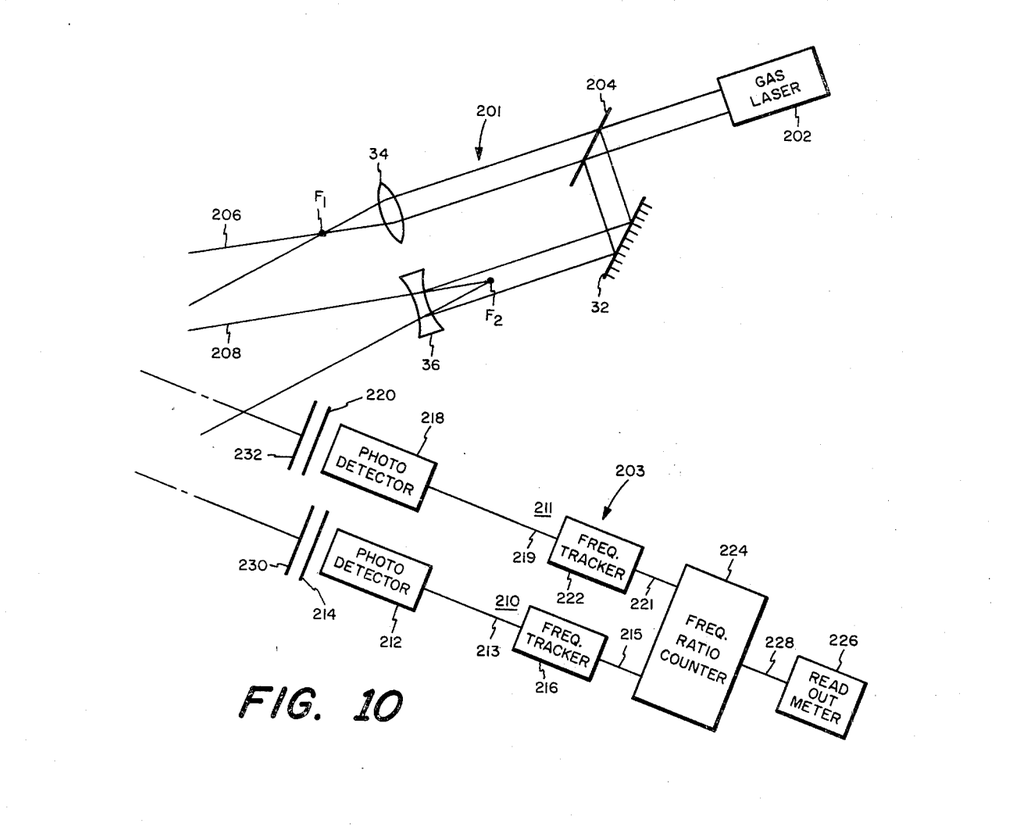
FIG. 10 illustrates, in block diagram form, a range finding instrument constructed in accordance with a third embodiment of the invention.

Another range finding instrument embodiment which functions to prevent the occurrence of high frequency beam interference, and attendant high background noise level, is indicated generally at 200 in FIG. 10 and, as seen therein, comprises transmitter means 201 and receiver means 203.

In this embodiment, the wave radiation beam source of the transmitter means 201 is constituted by a two color laser means in the nature of an argon laser 202 which is operative to simultaneously transmit highly coherent, coaxial wave radiation beams of significantly different wavelengths such as, for example, one beam at 488.0 $\mu$m and the other beam at 514.5 $\mu$m. Separation these wave radiation beams is effected by the use of dichroic mirror means 204 which function to transmit to lens means 34 the wave radiation beam of one wavelength, only, and to reflect for transmission to optical displacement element 32 and subsequent transmission to lens means 36 the wave radiation beam of the other wavelength, only. Thus are provided first and second wave radiation beams 206 and 208, respectively, each of which will, upon impingement and reflection from the non-illustrated target surface, result as above in the creation of a distant backscattered diffraction pattern.

The receiver means 203 of the range finding instrument 200 in essence constitutes two similarly constructed detecting channels as indicated at 210 and 211, respectively. The channel 210 comprises photodetector means 212—including optical grating means 214—and frequency tracker means 216, series connected as shown by path 213; while the channel 211 comprises photodetector means 218—including optical grating means 220—and frequency tracker means 222, series connected as shown by path 219.

Frequency ratio counter means 224 are connected as shown by paths 215 and 221, respectively, to each of the said frequency tracker means, while readout meter means 226 are connected to the counter means 224 by path 228.

Filter means 230 and 232 are respectively disposed as shown adjacent the optical grating means 214 and 220 to the sides thereof remote from the photodetector means 212 and 218. The filter means 230 have a pass band at the wavelength of the wave radiation beam 208, only, whereby the lobes of the backscattered diffraction pattern created by the said beam, only, will be passed by the said filter means. In similar manner, the filter means 232 have a pass band at the wavelength of the wave radiation beam 206, only, whereby the lobes of the backscattered diffraction pattern created by beam 206, only, will be passed by the filter means 232.

As a result, only one frequency spectrum will be generated by photodetector means 212 and transmitted to frequency tracker means 216 for the tracking of the center frequency thereof by the latter. In similar manner, and simultaneously therewith, only one frequency spectrum will be generated by photodetector means 218 and transmitted to frequency tracker means 222 for the tracking of the center frequency thereof. Thus, voltage outputs from the respective frequency tracker means, which are respectively indicative of the thusly generated spectrum center frequencies, will be simultaneously applied to the frequency ratio detector means 224 to result in the provision by readout meter means 226 of indicia of range as described hereinabove. High frequency, wave radiation beam interference and attendant high background noise level which might interfere with proper operation of the frequency tracker means may thus be readily understood to be prevented by the embodiment of FIG. 10.

Although disclosed in detail hereinabove primarily in the context of airborne altimeter applications, it is to be clearly understood that the range finding instruments of the invention should also prove well suited for use in a wide variety of other and different applications. Thus, for example, the instruments might also find useful applications as range finding instruments for use aboard a first space vehicle during an approach for the docking thereof with a second space vehicle, and as ground vehicle-borne or ship-borne range finding instruments for use in determining the range between said vehicle or ship, and a target which presents a non-specular reflecting surface which is susceptible to impingement of the respective, diverging wave radiation beams thereon. Too, and again within the context of airborne altimeter applications, it is believed clear that with the provision of suitably large separation ranges D, the range finding instruments of the invention will find excellent utilization in the provision of accurate, altimeter systems for orbiting spacecraft.

Although each of the hereinabove disclosed embodiments of this invention comprise laser means as the wave radiation beam source, it is to be made clear that, under certain circumstances, non-laser sources might also be used because it is not strictly necessary that the beam source have a center frequency in the optical region.

Thus, range finding instruments which operate, for example, in the microwave, infrared, millimeter or sub-millimeter, rather than optical, ranges might be implemented provided the manner of operation is such as to create the requisite backscattered diffraction patterns at the target surfaces. The nature of the electronic signal processing will be essentially the same for all operative transmitter wavelengths.

Although preferred embodiments of the invention have been described in considerable detail for illustrative purposes, many modifications will occur to those skilled in the art. It is therefore desired that the protection afforded by Letters Patent be limited only by the true scope of the appended claims.

What is claimed is:
1. In an instrument for determining the range between two objects having a relative velocity which includes an instrument operating velocity component, the improvements comprising,
generator means on a first of said objects for transmitting first and second beams of wave radiation toward the second of said objects and illuminating first and second finite areas thereon to produce first and second reflected diffraction patterns, each of which comprises distinct lobes of random amplitude and spacing,
receiving means on said first object for generating first and second frequency spectra having respective center frequencies which are determined by the respective rates at which said distinct lobes of said first reflected diffraction pattern and said distinct lobes of said second reflected diffraction pattern are swept past said receiving means as a result of said instrument operating velocity component, and
means operable upon said spectra to determine said range as a function of said spectra center frequencies.

2. In an instrument as in claim 1 wherein,
said generator means comprise means providing different effective sources for said first and second wave radiation beams, said effective beam sources being formed at different ranges from said second object.

3. In an instrument as in claim 1 wherein,
said receiving means comprise means forming at least one restricted receiving aperture disposed on said first object in fixed spatial relation to said generator means.

4. In an instrument as in claim 1 wherein,
said means operable upon said spectra comprise,
means for separating said spectra,
means for locating the center frequency of each of the thusly separated spectra, and
means for comparing said center frequencies to determine said range.

5. In an instrument as in claim 1 wherein,
said generator means comprise a source of a beam of wave radiation, and
means for splitting said beam to form said first and second beams of wave radiation.

6. In an instrument as in claim 1 wherein,
said receiver means comprise optical grating means with said instrument operating velocity component being the component of said relative object velocity which is normal to said optical grating means, and
photodetector means disposed on said first object adjacent said optical grating means on the side of the latter remote from said second object for producing first and second pluralities of signals from successive distinct lobes of said first and second reflected diffraction patterns as said lobes are swept past said optical grating means.

7. In an instrument as in claim 2 further comprising,
adjusting means for adjusting said effective source providing means whereby, the difference in range from said second object of said effective sources may be varied.

8. In an instrument as in claim 2 wherein,
said receiving means comprise means forming at least one restricted receiving aperture disposed on said first object in fixed spatial relation to said generator means.

9. In an instrument as in claim 8 wherein,
said means operable upon said spectra comprise,
means for separating said spectra,
means for locating the center frequency of each of the thusly separated spectra, and
means for comparing said center frequencies to determine said range.

10. In an instrument as in claim 9 further comprising,
means for adjusting said effective beam source providing means whereby, the difference in range from said second object of said effective beam sources may be varied.

11. In an instrument as in claim 10 wherein,
said means for separating said spectra comprise first and second filter network means each of which is arranged to pass a different one, only, of said spectra.
said means to locate said center frequencies comprise first and second frequency tracker means which are cooperatively associated, respectively, with said first and second filter network means and are each arranged to locate the center frequency of the spectra passed by the filter network cooperatively associated therewith, and
said means for comparing said center frequencies comprise frequency ratio counter means and readout meter means cooperatively associated therewith for providing indicia of said range.

12. In an instrument as in claim 2 further comprising, means to effect the orthogonal polarization of said first and second beams of wave radiation to thus prevent the occurrence of high frequency interference therebetween, notwithstanding the overlapping of said first and second finite areas.

13. In an instrument as in claim 11 further comprising, means to effect the orthogonal polarization of said first and second beams of wave radiation to thus prevent the occurrence of high frequency interference therebetween, notwithstanding the overlapping of said first and second finite areas.

14. In an instrument as in claim 8 wherein, the range $\rho_R$ between said restricted receiving aperture and said second object is substantially equal to the range between said first and second objects and may be defined as $$\rho_R = \frac{D}{2}\left(\frac{2-R}{R-1}\right)$$

wherein,
D is equal to the range separation between said first and second, effective wave radiation beam sources, and
R is equal to the radio between said spectra center frequencies.

15. In an instrument as in claim 10 wherein, the range $\rho_R$ between said restricted receiving aperture and said second object is substantially equal to the range between said first and second objects and may be defined as $$\rho_R = \frac{D}{2}\left(\frac{2-R}{R-1}\right)$$

wherein,
D is equal to the range separation between said first and second, effective wave radiation beam sources, and
R is equal to the ratio between said spectra center frequencies.

16. In an instrument as in claim 2 wherein, said wave radiation beam generating means comprise means to intermittently transmit each of said first and second beams of wave radiation toward said second object in such manner that when one of said beams is being transmitted, the other of said beams is not, and vice versa, whereby said receiving means will be generating only one of said spectra at any given point in time during the operation of said instrument.

17. In an instrument as in claim 16 wherein, said means to operate upon said spectra comprise means to locate the center frequency of each of said spectra, and
means to compare said center frequencies to determine said range.

18. In an instrument as in claim 17 further comprising, means for adjusting said effective beam source providing means whereby, the difference in range from said second object of said effective beam sources may be varied.

19. In an instrument as in claim 17 wherein, said means to compare said center frequencies comprise means to provide a signal indicative of one of said center frequencies,
means to provide a signal indicative of the other of said center frequencies,
switch means cooperatively associated with said center frequency locating means and each of said signal providing means, and
means synchronizing the operation of said switch means with said intermittent beam transmission means so that said frequency locating means is connected to one of said signal providing means when said first wave radiation beam is being transmitted, and said frequency locating means is connected to the other of said signal providing means when said second wave radiation beam is being transmitted.

20. In an instrument as in claim 19 wherein, said intermittent beam transmission means are arranged to transmit said first and second wave radiation beams for substantially equal periods of time,
said means to compare said center frequencies further comprise signal comparison means to compare said center frequency indicative signals and determine said range, and
said instrument further comprises time delay means cooperatively associated with one of said signal providing means to delay the application of the signal therefrom to said signal comparison means for substantially the duration of a wave radiation beam transmission whereby, said center frequency indicative signals may be substantially simultaneously applied to said signal comparison means.

21. In an instrument as in claim 20 wherein, said center frequency locating means comprise frequency tracker means,
said signal providing means comprise bucket counter means for providing output voltages indicative of said center frequencies, and
said signal comparison means comprise voltage ratio detector means and readout meter means cooperatively associated therewith for providing indicia of said range.

22. In an instrument as in claim 20 further comprising, means for adjusting said effective beam source providing means whereby, the difference in range from said second object of said effective beam sources may be varied.

23. In an instrument as in claim 22 wherein, said receiving means comprise means forming at least one restricted receiving aperture disposed on said first object in fixed spatial relation to said generator means, and
said restricted receiving aperture and one of said effective wave radiation beam sources are located at substantially the same range from said second object.

24. In an instrument as in claim 23 wherein, the range $\rho_R$ between said restricted receiving aperture and said second object is substantially equal to the range between said first and second objects and may be defined as $$\rho_R = \frac{D}{2}\left(\frac{2-R}{R-1}\right)$$

wherein,
D is equal to the range separation between said first and second, effective beam sources, and
R is equal to the ratio between said spectra center frequencies.

25. In an instrument for determining the range between two objects having a relative velocity which includes an instrument operating velocity component, the improvements comprising,
generator means on a first of said objects for transmitting a first wave radiation beam of a first wavelength and a second wave radiation beam of a second, and different, wavelength toward the second of said objects and illuminating first and second finite areas thereon to respectively produce first and second reflected diffraction patterns, each of which comprises distinct lobes of random amplitude and spacing,
receiving means on said first object comprising, first beam wavelength responsive means for generating a first frequency spectrum having a center frequency which is determined by the rate at which said distinct lobes of said first reflected diffraction pattern are swept therepast as a result of said instrument operating velocity component, and second beam wavelength responsive means for generating a second frequency spectrum having a center frequency which is determined by the rate at which said distinct lobes of said second reflected diffraction pattern are swept therepast as a result of said instrument operating velocity component, and means operable upon said spectra to determine said range as a function of said spectra center frequencies.

26. In an instrument as in claim 25 wherein, said generator means comprise a source of wave radiation beams of said first and second wavelengths, respectively, and means to separate said wave radiation beams in accordance with said wavelengths.

27. In an instrument as in claim 26 wherein, said wave radiation beams source comprises multicolor laser means, and said means to separate said wave radiation beams comprise dichroic mirror means.

28. In an instrument as in claim 25 wherein, said means for generating said first frequency spectrum comprises filter means having a pass-band at said first wavelength, and said means for generating said second frequency spectrum comprise filter means having a pass-band at said second wavelength.

29. In an instrument as in claim 27 wherein, said means for generating said first frequency spectrum comprises filter means having a pass-band at said first wavelength, and said means for generating said second frequency spectrum comprise filter means having a pass-band at said second wavelength.

30. In an instrument as in claim 25 wherein, said generator means comprise means providing different effective sources for said first and second wave radiation beams, said effective beam sources being formed at different ranges from said second object.

31. In an instrument as in claim 30 further comprising, adjusting means for adjusting said effective source providing means whereby, the difference in range from said second object of said effective sources may be varied.

32. In an instrument as in claim 29 wherein, said generator means comprise means providing different effective sources for said first and second wave radiation beams, said effective beam sources being formed at different ranges from said second object.

33. In an instrument as in claim 32 further comprising, adjusting means for adjusting said effective source providing means whereby, the difference in range from said second object of said effective sources may be varied.

34. In an instrument as in claim 33 wherein, said receiving means comprise means forming at least one restricted receiving aperture disposed on said first object in fixed spatial relation to said generator means.

35. In an instrument as in claim 34 wherein, the range $\rho_R$ between said restricted receiving aperture and said second object is substantially equal to the range between said first and second objects and may be defined as $$\rho_R = \frac{D}{2}\left(\frac{2-R}{R-1}\right)$$

wherein,

D is equal to the range separation between said first and second, effective wave radiation beam sources, and R is equal to the ratio between said spectra center frequencies.

References Cited

UNITED STATES PATENTS

| 3,266,365 | 8/1966 | Stavis | 356—4 |
| 3,373,441 | 3/1968 | Zadig | 356—28 |
| 3,409,369 | 11/1968 | Bickel | 356—28 |

RICHARD A. FARLEY, Primary Examiner

JEFFREY P. MORRIS, Assistant Examiner

U.S. Cl. X.R.

356—28

UNITED STATES PATENT OFFICE
CERTIFICATE OF CORRECTION

Patent No. 3,489,495        Dated January 13, 1970

Inventor(s) Donald Z. Blau et al.

It is certified that error appears in the above-identified patent and that said Letters Patent are hereby corrected as shown below:

Column 3, line 44, change the word "high" to --highly--.

Column 4, line 19, correct the spelling of the word "and".

Column 4, line 42, correct the spacing of the words "and the".

Column 5, line 35, correct the spelling of the word "indicated".

Column 7, line 2, change the word "thus" to --this--.

Column 8, lines 50 through 55, the equation should read:

$$\rho_R = \frac{D}{2} \left( \frac{2-R}{R-1} \right)$$

Column 8, line 56, change the word "radio" to --ratio--.

Column 11, line 17, correct the spelling of "result".

Column 13, line 51, change the phrase "out path" to read --output path--.

Column 13, line 68 change the word "radio" to read --ratio--.

Column 14, line 3, between the words "frequency and resolution" insert the word --signal--.

Column 19, line 31, change the word "comprises" to --comprise--.

SIGNED AND SEALED

JUN 16 1970

(SEAL)
Attest:

Edward M. Fletcher, Jr.
Attesting Officer

WILLIAM E. SCHUYLER,
Commissioner of Paten